Nov. 13, 1923.
W. M. SCOTT
1,474,172
ELECTRIC MEASURING INSTRUMENT
Filed Dec. 10, 1919
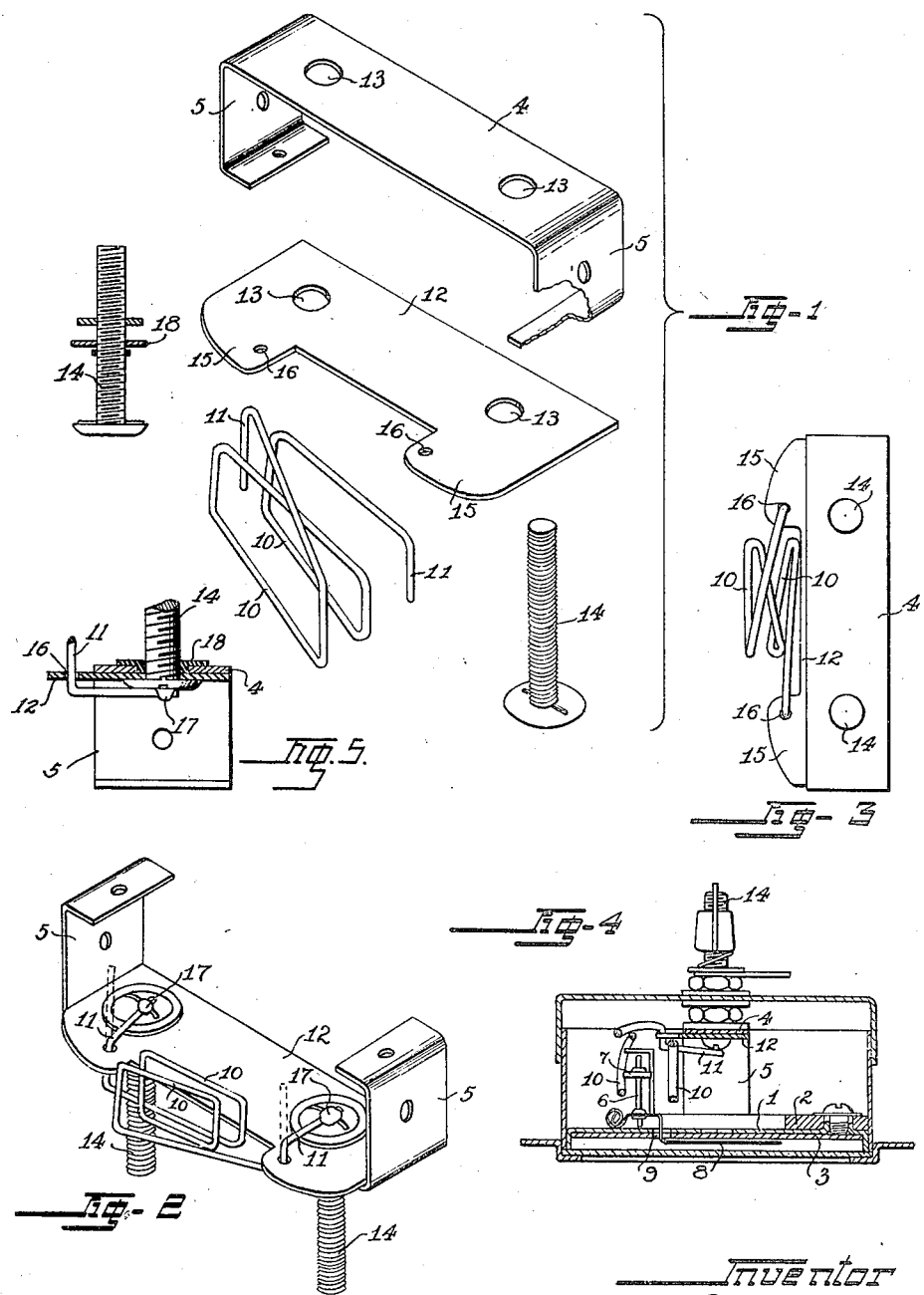

Patented Nov. 13, 1923.

1,474,172

UNITED STATES PATENT OFFICE.

WALTER M. SCOTT, OF CLEVELAND, OHIO.

ELECTRIC MEASURING INSTRUMENT.

Application filed December 10, 1919. Serial No. 343,839.

*To all whom it may concern:*

Be it known that I, WALTER M. SCOTT, a citizen of the United States, residing at Cleveland, in the county of Cuyahoga and State of Ohio, have invented a certain new and useful Improvement in Electric Measuring Instruments, of which the following is a full, clear, and exact description, reference being had to the accompanying drawings.

This invention relates to electric measuring instruments and has particular reference to a small sized ammeter such as frequently employed in the cowl-boards of explosion-engine vehicles to show the charging and discharging rate of the starting and lighting battery ordinarily used in connection therewith. In the earlier application Serial No. 213,854, filed jointly by myself and Raliegh E. Tresize on January 26, 1918 there was disclosed a certain simple and compact instrument of this nature; the present application comprehends an improvement upon that instrument, particularly as concerns certain practical steps in the manufacture of the device; and the objects of the present invention are the provision of a simplified and improved assemblage of instrument whereby its production can be cheapened and hastened; the provision of a combined support and insulator for the coil which shall expedite the making of the instrument and absolutely prevent short circuits thereof; while further objects and advantages will become apparent as the description proceeds.

In the drawings accompanying and forming a part of this application, I have illustrated one operative embodiment in which my invention can be utilized, but without excluding other specific constructions as will clearly appear from my claims. In these drawings, Fig. 1 is a perspective view illustrating in separated position the parts of the current-coil-unit prior to their assembly; Fig. 2 is a perspective view of the same parts subsequent to assembly; Fig. 3 is a bottom plan view of the parts shown in Fig. 2; and Fig. 4 is a sectional view through a complete instrument showing my improvements in place thereon. Fig. 5 is a cross section of the instrument.

Describing by reference characters the parts shown in these drawings, 1 represents a circular plate, 2 a permanent magnet attached to one side thereof and 3 a dial plate attached to the other side. Spanning the magnet is a bridge-member 4 having depending legs 5—5 at its ends which rest on the plate 1 and are suitably secured thereto. Suitably pivoted to the plate 1 perpendicular to its plane is a staff 6 carrying an armature 7 and a pointer 8, the latter extending through registering apertures 9 in the plate 1 and dial 3 so that its free end may be visible from the outside of the latter. The current coil is carried by the bridge 4 and is constructed and applied thereto independently of all of the rest of the mechanism and subsequently incorporated with the rest of the machine as a unit.

In the case of an ammeter, this coil preferably comprises two parallel rectangular wire loops 10—10, located one on each side of the armature 7, and is originally wound in a form or jig which leaves the coil with two spaced legs 11—11 parallel to each other and projecting in the same direction. To the inner or lower side of the bridge 4 between the legs 5—5 there is applied an insulating sheet or plate 12 of some stiff and rigid material such as fiber bakelite or the like, said plate and bridge being formed with registering apertures 13—13 for the reception of the screw-posts 14—14 by means of which the two are secured together and current subsequently brought into the instrument. Each post has a head formed with projecting teeth adapted to bite into the plate 12 so as to resist turning under the influence of the nuts afterward applied, rotation of the plate as a whole being prevented by the other post. One side of the plate 12 projects beyond the edge of the bridge 4 (see Figs. 3 and 4) and is formed at each end with an ear 15 in which is a hole 16 which receives one of the legs 11 of the coil. These legs are inserted from the opposite direction to that in which the posts 14 are applied, and are then bent laterally as shown in Fig. 2 so as to contact the heads of those posts to which they are attached by drops of solder 17. The solder however acts only to maintain good electric contact and has no function in holding the coil in place, the latter action being performed by the plate 12, so that even though the solder be melted by overload, there is no danger of the instrument coming to pieces. Furthermore, the fact that the plate 12 projects laterally further than the bridge 4 prevents the coil from ever coming into contact with any part thereof and thus producing a short circuit which might easily destroy the automobile. The posts 14—14 are insulated from the bridge by means of suitable washers 18 in the usual manner, in addition to which the holes in the bridge are made larger than the corresponding holes in the plate 12. By my improvements the coil 10 can be made of naked wire without danger of short circuiting, which further increases the simplicity and safety of the device.

Having thus described my invention, what I claim is:—

1. In an electric measuring instrument, in combination, a base-plate, a staff pivoted thereto, an armature carried by said staff, a plate of insulating material supported at one side of said base plate and having apertures therein, and a current coil having portions inserted through said apertures whereby it is supported and other portions contacting with current leads whereby it is energized.

2. In an ammeter, in combination, a plate of insulating material having a pair of apertures therein, a current coil having two parallel legs extending thru said apertures, said coil being thereby supported by said plate, and current leads connected to the portion of said legs which project through said apertures.

3. In an ammeter, in combination, a plate of insulating material having at each end an apertured ear, a current coil having a pair of spaced legs inserted in the apertures whereby the coil is supported, and current leads connected to said legs independently of all supporting devices.

4. In an electric measuring instrument, in combination, a plate of insulating material having a pair of apertures therein, a pair of attaching and conducting posts engaging said plate one near each aperture, and a current coil having spaced legs passing through said apertures, and projecting bent ends engaging said posts.

5. In an electric measuring instrument, a base-plate, a bridge member carried thereby, a plate of insulating material secured to said bridge member and projecting beyond the edge thereof, the projecting portion of said last plate having a pair of spaced apertures therein, and a current coil having portions passing through said apertures whereby said coil is both supported in position and insulated from other parts of the device.

6. As a part for an electric measuring instrument, a current coil comprising a pair of electro magnetic loops connected together in series and spaced slightly apart upon a common axis, the terminals of said loops being spaced apart and turned in the same direction, in combination with a plate of insulating material having spaced apertures thru which said terminals extend, said coil being supported by the engagement of said ends in said apertures.

7. As a part for an electric measuring instrument, a current coil having its terminals located both on the same side of said coil, and turned in the same direction, in combination with a plate of insulating material having spaced apertures, thru which said terminals extend, said coil being supported by the engagement of said ends in said apertures.

8. In an electric measuring instrument, in combination, a metal supporting member having spaced apertures therein, a plate of insulating material having similarly spaced apertures registering with the said first apertures, and also having holes, one near each aperture, a current coil having two legs located at the same side of the body of the coil, each of said legs having a portion engaged in one of said holes whereby movement of the coil is prevented, and a combined securing stud and current terminal traversing each aperture and making electric contact with the adjacent leg of the coil.

9. In an electric measuring instrument, the combination with a metal supporting member having spaced apertures therein, of a plate of insulating material having spaced smaller apertures which register with the first apertures, threaded studs traversing said apertures, insulating washers surrounding said studs on the opposite side of said metal member, nuts screwed on said studs and pressing against said washers, and a current coil having two legs located at the same side of the body of the coil and operatively connected one to each stud, means being provided whereby said studs are non-rotatably secured in their respective apertures, the body of said coil being freely suspended.

In testimony whereof, I hereunto affix my signature.

WALTER M. SCOTT.